United States Patent
Schmid

(10) Patent No.: US 7,584,999 B2
(45) Date of Patent: Sep. 8, 2009

(54) IGNITER FOR AN AUTOMOTIVE SAFETY DEVICE

(75) Inventor: Günther Schmid, Rothis (AT)

(73) Assignee: Hirschmann Austria GmbH, Rankwell-Brederis (AT)

( * ) Notice: Subject to any disclaimer, the term of this patent is extended or adjusted under 35 U.S.C. 154(b) by 111 days.

(21) Appl. No.: 10/840,757

(22) Filed: May 6, 2004

(65) Prior Publication Data

US 2005/0005805 A1    Jan. 13, 2005

(30) Foreign Application Priority Data

May 7, 2003    (DE) ................ 103 20 193

(51) Int. Cl.
B60R 22/36    (2006.01)
(52) U.S. Cl. ..................... 280/806; 242/374
(58) Field of Classification Search ............... 280/806; 60/632, 636; 102/205, 202.14; 242/374
See application file for complete search history.

(56) References Cited

U.S. PATENT DOCUMENTS

| | | | |
|---|---|---|---|
| 5,553,890 A * | 9/1996 | Buhr et al. ................ 280/806 |
| 5,641,131 A * | 6/1997 | Schmid et al. ............. 242/374 |
| 5,842,344 A * | 12/1998 | Schmid ..................... 60/632 |
| 5,956,954 A * | 9/1999 | Schmid ..................... 60/636 |
| 6,149,095 A * | 11/2000 | Specht et al. .............. 242/374 |
| 6,155,512 A * | 12/2000 | Specht et al. .............. 242/374 |
| 6,227,478 B1 * | 5/2001 | Hudelmaier et al. ........ 242/374 |
| 6,454,306 B1 * | 9/2002 | Cunningham et al. ....... 280/806 |
| 6,708,914 B2 * | 3/2004 | Stevens .................... 242/374 |
| 6,979,024 B2 * | 12/2005 | Cunningham et al. ....... 280/806 |
| 2003/0111832 A1 * | 6/2003 | Kelley et al. ............... 280/736 |

FOREIGN PATENT DOCUMENTS

| | | |
|---|---|---|
| DE | 44 44 319 | 6/1995 |
| DE | 44 04 462 | 8/1995 |
| DE | 195 33 293 | 3/1996 |
| DE | 197 08 980 | 3/1998 |
| DE | 298 12 801 | 1/1999 |

* cited by examiner

*Primary Examiner*—Troy Chambers
(74) *Attorney, Agent, or Firm*—Andrew Wilford

(57) ABSTRACT

An igniter for an automotive safety system, for example a seat belt tensioner or an air bag, has an explosive squib mounted in a housing with an explosive charge ignitable by the squib but directing its reaction force toward the squib.

5 Claims, 4 Drawing Sheets

IGNITER FOR AN AUTOMOTIVE SAFETY DEVICE

FIELD OF THE INVENTION

The present invention relates to an igniter for an automotive safety device such as an air bag or a belt tightener. More particularly, the invention relates to an igniter for an explosive charge located in a housing and which produces a force for tightening a seat belt or like harness structure for an automotive vehicle or which enables the discharge into an air bag or like safety device of gases capable of substantially instantaneously inflating the bag.

BACKGROUND OF THE INVENTION

Igniters for explosive charges which can be used in an automotive safety system are of course known. Such igniters, known also as explosive squibs, are connected to electrical conductors which are connected to a control device which, in case of a crash, can apply the potential to the conductors or lead to firing the squib. The firing of the squib, in turn, ignites an explosive charge which inflates the folded bag or drives an element, for example, a piston, to tighten the belt. For that purpose, the squib was disposed in a housing and the explosive force from the squib was directed toward the explosive charge which was to be ignited. While the explosive charge or main charge was thus ignited, the force of the explosion of the squib had a tendency to act in the same direction as the explosion of the charge, resulting in a transmission of energy toward a free space. To a certain extent the explosions drove particles of the charge in the direction of this free space and in which these particles did not completely burn. It was required, therefore, to increase the size of the charge to take into consideration the fact that a portion thereof, driven away from the squib by the explosive force thereof and the explosion or the main charge, did not contribute to the production of energy which in turn was utilized to expand the air bag or to displace the member for tightening the belt.

OBJECTS OF THE INVENTION

It is, therefore, the principal object of the present invention to provide an automotive safety system which can utilize a smaller charge for a given force or energy generation in the expansion of an air bag and/or the securing of a safety belt.

It is another object of the invention to provide an improved igniter for an automotive safety device in which the loss of energy resulting from noncombusting particles can be minimized and where, with an increased utilization of the charge, the size of the charge can be reduced.

Still another object of the invention is to provide an igniter for an automotive safety device which eliminates drawbacks of earlier systems.

SUMMARY OF THE INVENTION

The igniter for an automotive safety device according to the invention can comprise:
an explosive squib forming a primer for the igniter;
a housing receiving the squib and provided with an energy transfer unit for delivering explosive energy to the automotive safety device; and
an explosive charge in the housing for triggering by the squib and configured following triggering to produce a reaction force in a direction toward the squib while delivering the explosive energy to the automotive safety device.

According to the invention the main charge is so arranged in a compartment of the housing that upon the triggering of the main charge, a reaction force of a substantially instantaneous or impulsive nature is produced in the direction of the igniting squib. This means that after the squib is fired, a force is produced by the explosion of the main charge toward the squib, i.e. in the direction of the squib, so that neither energy nor gases are dissipated by being blown away from the squib.

With the firing of the squib, the main charge ignites and normally will be located in a defined space so that it can be completely ignited or burned and so that the combustion takes place completely in the defined space, whereby a reaction force is generated in that space and is directed oppositely to the explosion direction of the squib. By contrast with earlier igniting devices, the combustion of the main charge is effected in a predetermined fixed space which has only a small opening through which the reaction force is directed. The combustion is limited therefore to that space and in this limited space the combustion is effected completely so that only the amount of the charge required in that space is provided in the first place.

In the case of a belt tightener, according to the invention, the main charge which is provided in a compartment of the effector element which can be, for example, a piston which is mounted to shift in the housing of the igniter and can receive the squib at least in part. When the squib fires and the charge explodes, the drive element is linearly displaced and pulls the belt tight. Other kinds of movement can also be provided.

According to a feature of the invention, the compartment of the drive element receiving the explosive charge and displaceable in the housing to activate the automotive safety device, is closed in the direction of the squib by a disk which can have an orifice or hole configured as a nozzle. As a general matter, a nozzle directed toward the squib can be provided between the squib and the charge. Prior to movement of the drive element, the squib can be received in the compartment.

BRIEF DESCRIPTION OF THE DRAWING

The above and other objects, features, and advantages will become more readily apparent from the following description, reference being made to the accompanying drawing in which.

SPECIFIC DESCRIPTION

Figure 1A:
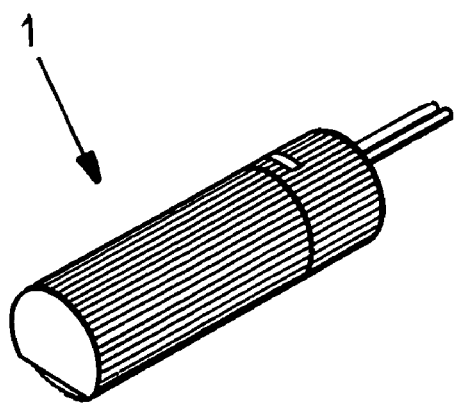
FIG. 1A is a perspective view of the igniter in the assembled position.
Figure 1:
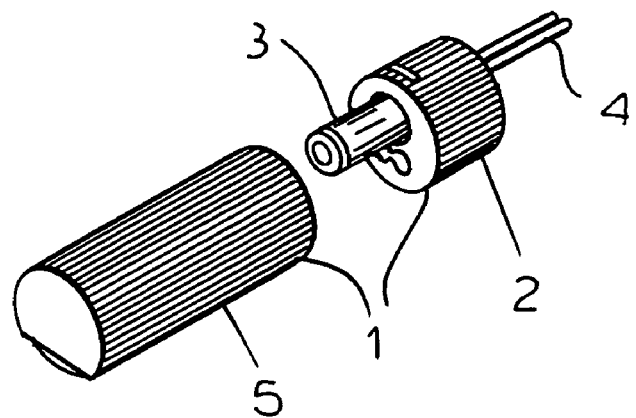
FIG. 1 is an exploded view of an igniter according to the invention.

FIGS. 1 and 1A show the construction of an igniter 1 which is used especially for a seat belt system in which the igniter upon triggering, pulls the seat belt tightly against the occupant of the vehicle. This igniter 1 is comprised of a base housing 2 which receives the squib 3. From the base 2 electrical conductors 4, which run to the squib 3 and can, upon application of an electrical pulse from a respective control unit, trigger the firing of the squib.

A housing 5 can cover and enclose the squib and can receive one or more charges to be ignited by the squib. The explosive charge which is located in the chamber 8 of a piston 6 can be a granular mass, tablets, a coherent body of explosive grains or the like.

Figure 2:
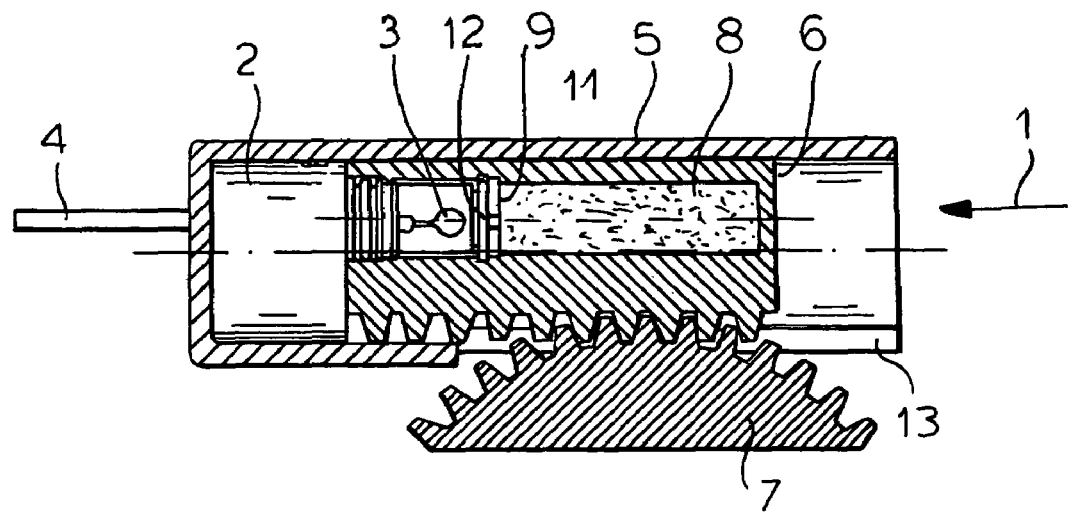
FIG. 2 is a cross sectional view through the igniter prior to triggering.

FIG. 2 shows a longitudinal section through the igniter 1 and in FIG. 2 the parts of the igniter are shown prior to firing of the squib 3 and the displacement of the piston 6.

Within the housing 5, the piston 6 is provided to form a drive element for pulling the seat belt tight. The piston 6 is in the form of a rack which meshes with a driven element 7, e.g. a pinion. Other systems for tightening the seat belt can also be used and for example, the piston 6 can be connected directly to a steel cable which, in the case of a crash, applies tension to the seat belt.

The compartment 8 receiving the explosive charge 11 is of tubular configuration and is substantially completely enclosed by the drive element 6 except for an opening in the direction of the squib 3. This opening is closed after filling of the compartment 8 with the explosive charge and for this purpose a disk 9 can be used. The disk 9 can have a nozzle-shaped orifice 12 directed toward the squib 3.

As a consequence upon firing of the squib and the ignition of the charge 11, the reaction force is applied in the direction of the squib and the charge is not dissipated into empty space in the opposite direction. Since the explosive force of the charge is concentrated in the direction of the squib 3, dissipation of the energy of the explosion is precluded. As can be seen from FIG. 2, the squib is at a fixed end of the housing or base 2 toward which the reaction force is directed and, in addition, the squib 3 also can extend into the compartment 8 so that the effect of the exploding squib 3 is directed fully toward the explosive charge 11.

Figure 3:
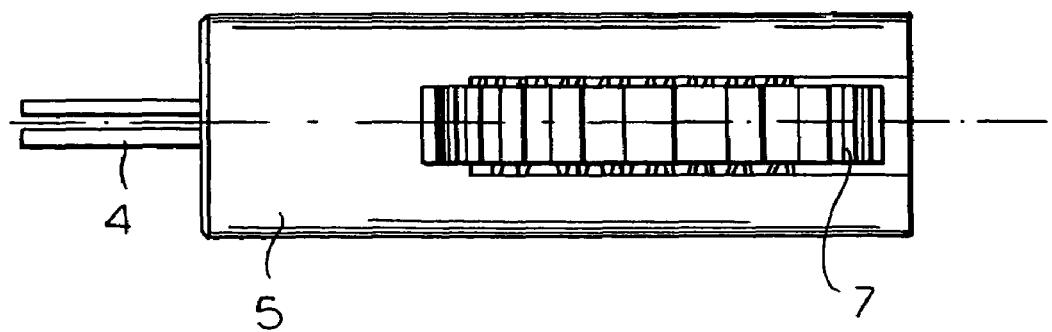
FIG. 3 is a bottom view of the igniter of FIG. 2.
Figure 4:
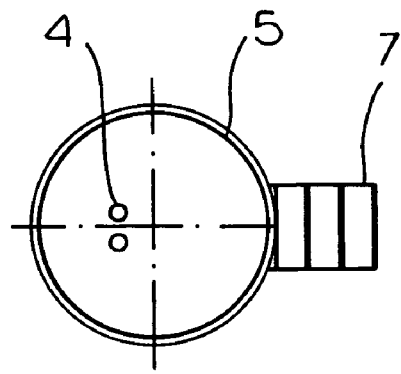
FIG. 4 is a transverse section.

FIG. 3 shows the underside of the igniter from which it is apparent that the coupling of the drive element 6 and the driven element 7 is effected through a window 13 in a wall of the housing 5.

Figure 5:
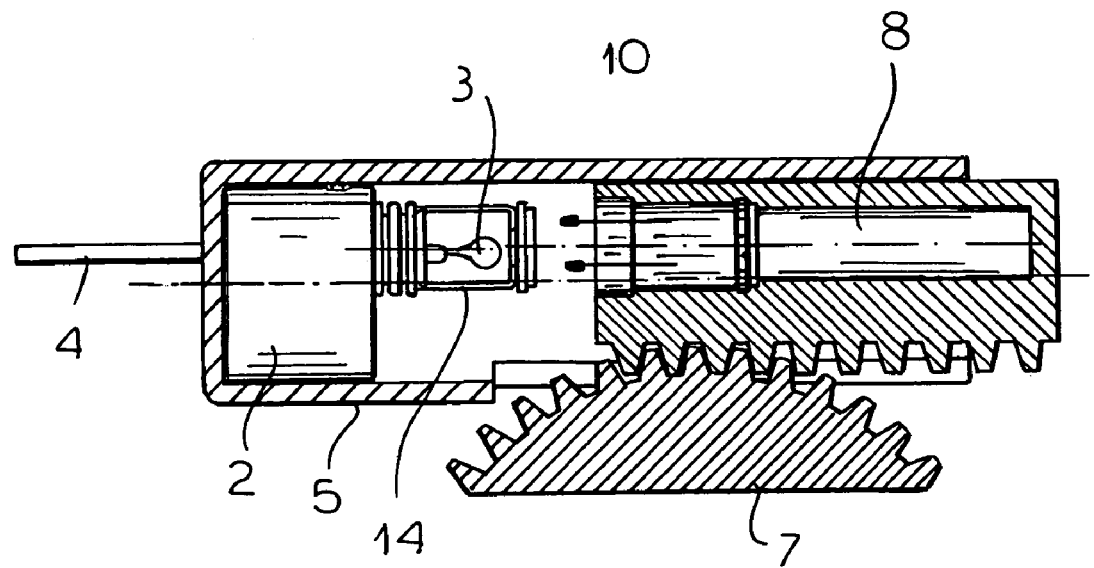
FIG. 5 is a view similar to FIG. 2 but showing the positions of the parts shortly after the ignition of the explosive charge.

In FIG. 5 the igniter is shown shortly after the squib 3 has fired, even though it has been illustrated in an intact state in this Figure for better understanding. It can be seen that the drive element 6 has been longitudinally shifted to the right and may be further shifted in this direction when the charge in the compartment 8 fully burns. The compartment 8 opens toward the squib and the reaction force, as represented by the arrow 10, is directed toward the squib 3 and following the destruction of the squib, against the fixed base 2 of the housing. At the beginning of and during combustion of the explosive charge, the space available for expansion of gases is limited so that the charge can fully burn and is not dissipated by being blown away from the squib.

The squib 3 is surrounded by a squib housing 14 which may lie coaxial to the space or compartment 8.

Figure 6:
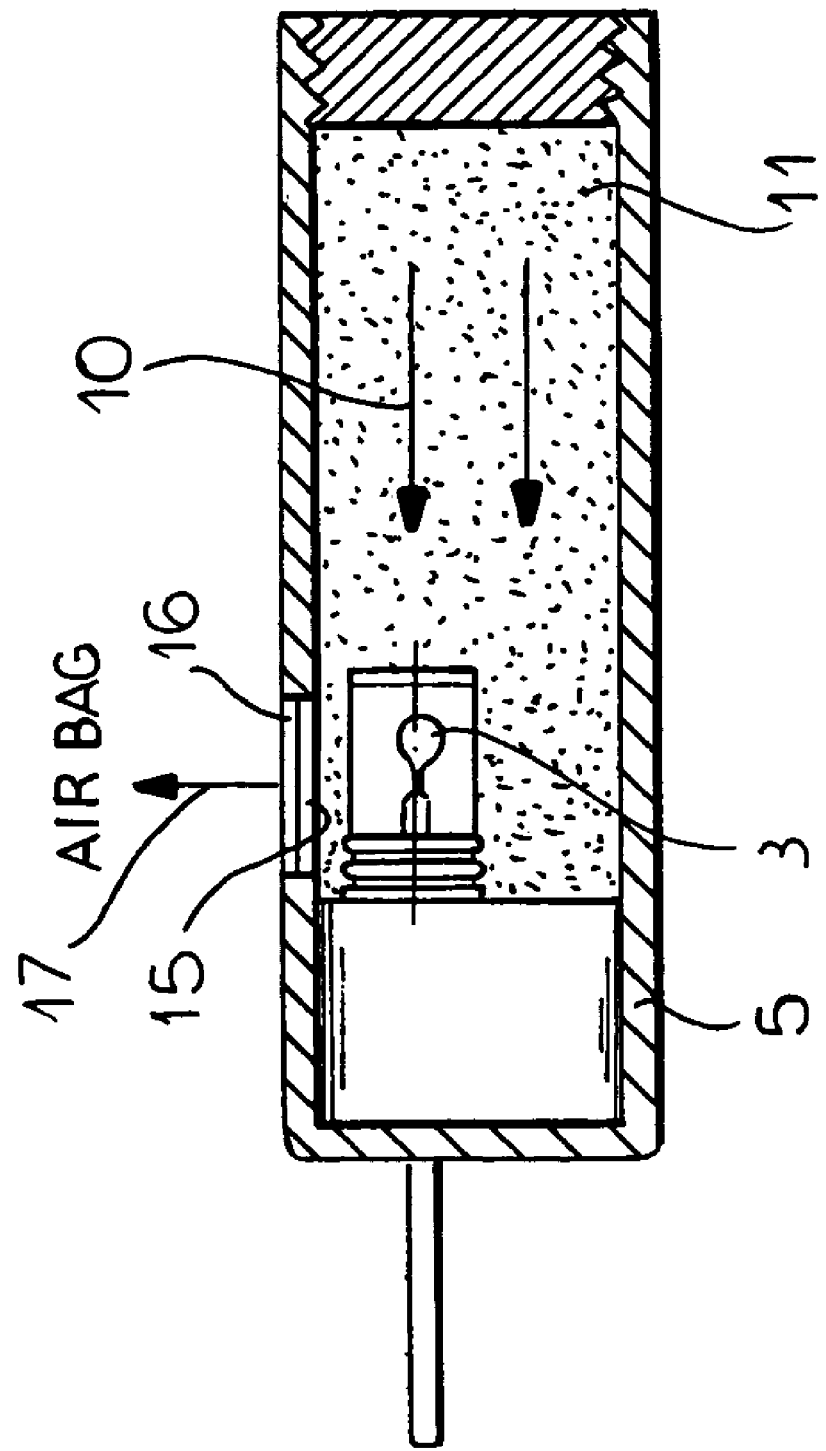
FIG. 6 is a cross sectional view showing the igniter as applied to a device in inflating an air bag.

In FIG. 6, the squib 3 also receives a reaction force 10 upon firing of the charge 11 but the gasses from the explosion pass through an opening 15 in the housing 5 and can rupture a disk 16 to expand the air bag as represented by an arrow 17.

I claim:

1. An igniter for an automotive safety device, the igniter comprising:
    an explosive squib forming a primer for said igniter;
    a housing receiving said squib;
    an energy transfer unit forming with the housing a chamber holding the squib, the unit being shiftable relative to the housing for delivering explosive energy to the automotive safety device;
    an explosive charge in the energy transfer unit adjacent the squib for triggering by said squib and configured following triggering to produce a reaction force in a direction toward said squib while delivering said explosive energy to the automotive safety device; and
    a disk fitted to the energy transfer unit, having a hole, and provided between the explosive squib and the explosive charge within said housing, wherein the explosive squib and the explosive charge are adjacent to each other, and are separated from one another by the disk.

2. The igniter defined in claim 1 wherein said explosive charge and the disk are provided in the chamber of the energy transfer unit, the energy transfer unit being displaceable in said housing to activate said automotive safety device.

3. The igniter defined in claim 2 wherein the chamber is closed in the direction of said squib by the disk.

4. The igniter defined in claim 2 wherein prior to firing of said squib said squib is received in the chamber.

5. The igniter defined in claim 1 wherein said automotive safety device is a safety belt and said igniter is provided with a device for tightening said safety belt.

* * * * *